(12) United States Patent
Kadotani et al.

(10) Patent No.: US 9,411,217 B2
(45) Date of Patent: Aug. 9, 2016

(54) PROJECTOR WITH LIGHT CONTROL APPARATUS THAT ADJUSTS A COVERED AMOUNT OF A BLOWOFF PORT IN ACCORDANCE WITH AN AMOUNT OF SHIELDED LIGHT

(71) Applicant: Seiko Epson Corporation, Tokyo (JP)

(72) Inventors: Norikazu Kadotani, Matsumoto (JP); Masato Kadotani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 74 days.

(21) Appl. No.: 14/456,530

(22) Filed: Aug. 11, 2014

(65) Prior Publication Data

US 2015/0070660 A1 Mar. 12, 2015

(30) Foreign Application Priority Data

Sep. 11, 2013 (JP) ................................. 2013-188033

(51) Int. Cl.
| | |
|---|---|
| *G03B 21/16* | (2006.01) |
| *G03B 21/20* | (2006.01) |
| *G02B 27/10* | (2006.01) |
| *G02B 27/14* | (2006.01) |

(52) U.S. Cl.
CPC ............ *G03B 21/16* (2013.01); *G02B 27/1046* (2013.01); *G02B 27/141* (2013.01); *G02B 27/145* (2013.01); *G02B 27/149* (2013.01); *G03B 21/2053* (2013.01)

(58) Field of Classification Search
CPC ........ G03B 21/16; G03B 21/18; G03B 21/58; F21V 29/02; F21V 29/10; F21V 29/20; F21V 11/08; G02F 1/133382; G02F 1/33385; H04N 9/3144
See application file for complete search history.

(56) References Cited

U.S. PATENT DOCUMENTS

| | | | | |
|---|---|---|---|---|
| 2004/0080722 | A1* | 4/2004 | Yamasaki | G03B 21/14 353/97 |
| 2004/0257491 | A1* | 12/2004 | Kitabayashi | G02F 1/133385 349/58 |
| 2010/0188641 | A1 | 7/2010 | Momose et al. | |
| 2011/0234987 | A1* | 9/2011 | Tanaka | F21V 29/02 353/52 |
| 2011/0234990 | A1* | 9/2011 | Tadachi | G03B 21/16 353/58 |
| 2011/0234991 | A1* | 9/2011 | Nagumo | G03B 21/16 353/61 |

FOREIGN PATENT DOCUMENTS

| | | |
|---|---|---|
| JP | 2010-175589 A | 8/2010 |
| JP | 2010-224249 A | 10/2010 |

\* cited by examiner

*Primary Examiner* — Sultan Chowdhury
(74) *Attorney, Agent, or Firm* — ALG Intellectual Property, LLC

(57) ABSTRACT

A projector includes a light source, a light control apparatus having a light shield portion that shields light emitted from the light source, the light control apparatus adjusting the amount of light that passes therethrough, an optical element that is disposed on the light exiting side of the light shield portion and optically converts light incident on the optical element, a cooling fan that sends cooling air, and a duct that guides the cooling air sent from the cooling fan to the light shield portion and the optical element which are the targets to be cooled, wherein the duct has a blowoff port off which the guided cooling air is blown toward each target to be cooled, and the light shield portion changes the amount of covered blowoff port in accordance with the amount of light that the light shield portion shields.

7 Claims, 8 Drawing Sheets

PROJECTOR WITH LIGHT CONTROL APPARATUS THAT ADJUSTS A COVERED AMOUNT OF A BLOWOFF PORT IN ACCORDANCE WITH AN AMOUNT OF SHIELDED LIGHT

BACKGROUND

1. Technical Field

The present invention relates to a projector.

2. Related Art

There is a known projector of related art including a light modulator that modulates light outputted from a light source apparatus in accordance with image information and a projection lens that projects the light modulated by the light modulator. As a projector of this type, to improve or otherwise change the contrast of a projected image, there is a known projector including a light control apparatus that shields part of the light outputted from the light source apparatus to adjust the amount of light incident on the light modulator. In the projector including the light control apparatus, when the light control apparatus shields a small amount of incident light, an optical element disposed on the light exiting side of the light control apparatus absorbs the light and hence generates heat, whereas when the light control apparatus shields a large amount of incident light, the light control apparatus absorbs the light and hence generates heat. In view of the situation described above, there is a proposed projector in which the flow rate of cooling air to be sent to the members described above is changed in accordance with the adjustment of the amount of light shielded by the light control apparatus (see JP-A-2010-224249, for example).

The projector described in JP-A-2010-224249 includes a light control apparatus, a polarization conversion element that is disposed on the light exiting side of the light control apparatus and optically converts incident light, a cooling fan, a duct that guides cooling air discharged from the cooling fan to the light control apparatus and the polarization conversion element, an open/close member, and a driver that drives the open/close member.

The projector described in JP-A-2010-224249 is so configured that the open/close member is driven to change the state of a delivery port of the duct, specifically, the degree of opening of the delivery port in such way that when the light control apparatus shields a large amount of light, the cooling air is delivered toward the light control apparatus, whereas when the light control apparatus shields a small amount of light, the cooling air is delivered toward the polarization conversion element.

The technology described in JP-A-2010-224249, however, requires the open/close member and the driver that drives the open/close member, undesirably resulting in an increase in the number of parts and an increase in the size of the projector because the open/close member and the driver are accommodated therein. Further, since electric power that drives the driver is required, undesirably also resulting in an increase in electric power consumed by the projector.

SUMMARY

An advantage of some aspects of the invention is to solve at least a part of the problems described above, and the invention can be implemented as the following forms or application examples:

Application Example 1

A projector according to this application example includes a light source, a light control apparatus having a light shield that shields light emitted from the light source, the light control apparatus adjusting the amount of light that passes therethrough, an optical element that is disposed on the light exiting side of the light shield and optically converts light incident on the optical element, a cooling fan that sends cooling air, and a duct that guides the cooling air sent from the cooling fan to the light shield and the optical element. The duct has a blowoff port off which the guided cooling air is blown toward the light shield and the optical element, and the light shield changes the position thereof in such a way that the amount of covered light-shield-side portion of the blowoff port increases as the amount of shielded light.

When the amount of light shielded by the light shield decreases, that is, when the amount of light that the light control apparatus allows to pass increases, the optical element disposed on the light exiting side of the light control apparatus is irradiated with an increased amount of light and the temperature of the optical element increases accordingly. On the other hand, when the amount of light shielded by the light shield increases, that is, when the amount of light that the light control apparatus allows to pass decreases, the amount of light with which the optical element is irradiated decreases but the amount of light with which the light shield is irradiated increases, resulting in an increase in the temperature of the light shield.

According to the configuration described above, since the light shield changes the position thereof in such a way that the amount of covered light-shield-side portion of the blowoff port increases as the amount of shielded light decreases, the cooling air is blown off the optical-element-side portion of the blowoff port at an increased speed by an increased amount. As a result, the optical element heated to a high temperature when the light control apparatus allows a large amount of light to pass can be efficiently cooled.

On the other hand, since the light shield changes the position thereof in such a way that the amount of covered light-shield-side portion of the blowoff port decreases as the amount of shielded light increases, the cooling air is blown off the light-shield-side portion of the blowoff port when a large amount of light is shielded, whereby the light shield that is heated to a high temperature can be efficiently cooled. As a result, increases in the temperatures of the light shield and a member disposed in a position in the vicinity of the light shield can be suppressed.

Therefore, without using any member other than the light control apparatus, the direction and speed of the cooling air blown off the blowoff port can be so adjusted that the optical element, the light shield, and a member disposed in a position in the vicinity of the light shield, the temperatures of which increase by different amounts in accordance with the state of the action of the light control apparatus, can be efficiently cooled, whereby degradation of the members described above due to the high temperatures can be suppressed. The projector provided in accordance with the present application example can therefore project an image having satisfactory image quality with the light control apparatus operating in a stable manner and optical characteristics of the optical element and performance of the member disposed in a position in the vicinity of the light shield ensured for a long period.

Application Example 2

In the projector according to the application example described above, it is preferable that the light shield is formed of a pair of light shields provided on opposite sides of an optical axis of the light emitted from the light source, that the light control apparatus adjusts the amount of light that passes through the light shields in accordance with a separation distance between the pair of light shields produced by rotation thereof, and that the amount of covered light-shield-side portion of the blowoff port changes in accordance with rotation of one of the pair of light shields.

According to the configuration described above, the light shield is formed of a pair of light shields, and rotating the light shields allows adjustment of the amount of light that passes therethrough. And the amount of covered light-shield-side portion of the blowoff port changes in accordance with rotation of one of the pair of light shields. That is, the blowoff port is disposed on the side where the one of the light shields is present, and the one of the light shields is caused to separate from the blowoff port in a state in which the pair of light shields approach each other and the amount of light that passes therethrough decreases accordingly, whereas the one of the light shields is caused to approach the blowoff port, that is, the amount of covered light-shield-side portion of the blowoff port can be increased as the state in which the amount of light that passes through the pair of light shields is small transitions to a state in which the pair of light shield s are so rotated that the amount of light that passes therethrough gradually increases (the amount of light shielded by the light shields decreases). The amount of light that passes through the pair of light shields and the amount of light-shield-side blowoff portions covered with the one of the light shield can be readily adjusted.

Application Example 3

In the projector according to the application example described above, it is preferable that each of the light shields rotates around an axis of rotation that is shifted from the light shield toward the optical element and parallel to a plane perpendicular to the optical axis of the light emitted from the light source.

According to the configuration described above, since each of the light shields rotates around the axis of rotation described above, which is shifted from the light shield toward the optical element, the light shield can not only cover the light-shield-side portion of the blowoff port but also adjust the amount of light that passes through the light shields even when the blowoff port is formed in a position shifted from the light shield toward the optical element. The cooling air can therefore be sent to the optical element more efficiently.

Application Example 4

In the projector according to the application example described above, it is preferable that the blowoff port is formed to blow the cooling air along a path outside a trajectory along which the one of the light shields rotates and in a direction that intersects the rotation trajectory when viewed in the direction of the corresponding axis of rotation.

According to the configuration described above, since the blowoff port is formed as described above, the one of the light shields, specifically, the light shielding portion thereof can cover the light-shield-side portion of the blowoff port. The one of the light shields therefore does not necessarily have a special portion for covering the blowoff port, whereby the shape of the light shield can be simplified.

Application Example 5

In the projector according to the application example described above, it is preferable that the blowoff port has a light-shield-side blowoff portion that is a blowoff portion for the light shield and an optical-element-side blowoff portion that is a blowoff portion for the optical element, and that the shape of an opening of the light-shield-side blowoff portion differs from the shape of an opening of the optical-element-side blowoff portion.

According to the configuration described above, since the blowoff port is formed as described above, the shape of each of the openings can be set in correspondence with the optical element, the light shield, and a portion in the vicinity of the light shield where the temperature of the portion is likely to rise, and the cooling air can be sent to the members described above. The optical element, the light shield, and the portion in the vicinity of the light shield can therefore be more efficiently cooled.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to the drawings.

The projector according to the present embodiment modulates light emitted from a light source in accordance with image information and enlarges and projects the modulated light on a screen or any other projection surface.

Primary Configuration of Projector

Figure 1:
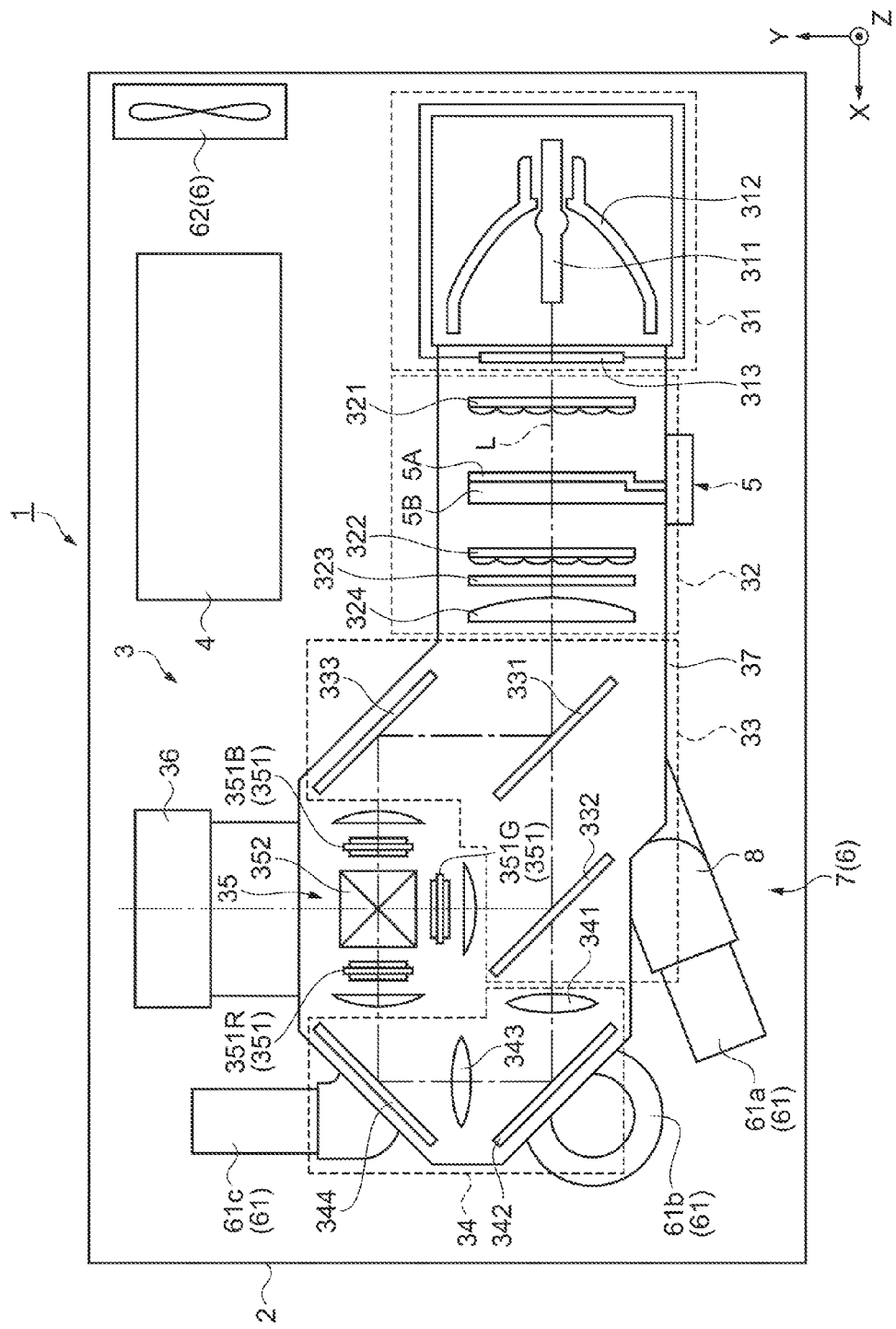
FIG. 1 is a diagrammatic view showing a schematic configuration of a projector according to an embodiment of the invention.

FIG. 1 is a diagrammatic view showing a schematic configuration of a projector 1 according to the present embodiment.

The projector 1 includes an exterior enclosure 2, which forms the exterior of the projector 1, a controller (not shown), an optical unit 3, which includes a light source apparatus 31, a power supply apparatus 4, which supplies the light source apparatus 31, the controller, and other components with electric power, and a cooling apparatus 6, as shown in FIG. 1.

The exterior enclosure 2, although not described in detail, is formed of a plurality of members, specifically, provided with an intake port through which outside air is introduced, an exhaust port through which heated air in the exterior enclosure 2 is exhausted out thereof, and other components.

The controller includes a CPU (central processing unit), a ROM (read only memory), a RAM (random access memory), and other components and functions as a computer. The controller controls the action of the projector 1, for example, performs control associated with image projection.

The optical unit 3 optically processes light outputted from the light source apparatus 31 and projects the processed light under the control of the controller.

The optical unit 3 includes not only the light source apparatus 31 but also an optical integration illumination system 32, a color separation system 33, a relay system 34, an optical apparatus 35, a projection lens 36, a light control apparatus 5, and an optical part enclosure 37, in which the optical parts described above are disposed in predetermined positions along the optical path, as shown in FIG. 1.

The optical unit 3 has a substantially L-like shape in a plan view and has one end at which the light source apparatus 31 is removably disposed and the other end at which the projection lens 36 is disposed, as shown in FIG. 1. In the following sections, the following directions are defined for convenience of description: A +X direction is the direction in which the light source apparatus 31 outputs light; a +Y direction (forward direction) is the direction in which light exits out of the projection lens 36; and a +Z side is the upper side in the attitude of the projector 1 installed on a desktop or any other surface.

The light source apparatus 31 includes a discharge-type light source 311, which is formed, for example, of an ultra-high-pressure mercury lamp or a metal halide lamp, a reflector 312, and a parallelizing lens 313. In the light source apparatus 31, after light emitted from the light source 311 is reflected off the reflector 312, the traveling directions of light rays that form the reflected light are aligned with one another by the parallelizing lens 313, and the parallelized light exits out of the light source apparatus 31 toward the optical integration illumination system 32.

The optical integration illumination system 32 includes a first lens array 321, a second lens array 322, a polarization conversion element 323, and a superimposing lens 324.

The first lens array 321 has a configuration in which lenslets each of which has a substantially rectangular contour when viewed in the direction of an optical axis L of the light having exited out of the light source apparatus 31 are arranged in a matrix, and the thus configured first lens array 321 divides the light having exited out of the light source apparatus 31 into a plurality of sub-light fluxes. The second lens array 322 has substantially the same configuration as that of the first lens array 321. The second lens array 322 along with the superimposing lens 324 substantially superimposes the sub-light fluxes on one another on a surface of each liquid crystal panel that will be described later. The polarization conversion element 323 has a function of aligning randomly oscillating light having exited out of the second lens array 322 into a substantially one type of polarized light that can be used by the liquid crystal panels. The polarization conversion element 323 is disposed on the light exiting side of light shields 5A and 5B, which form the light control apparatus 5 and will be described later, and corresponds to an optical element that optically converts light incident thereon.

The color separation system 33 includes two dichroic mirrors 331 and 332 and a reflection mirror 333 and has a function of separating light having exited out of the optical integration illumination system 32 into the following three types of color light: red light (hereinafter referred to as "R light"), green light (hereinafter referred to as "G light"), and blue light (hereinafter referred to as "B light").

The relay system 34 includes a light-incident-side lens 341, a relay lens 343, and reflection mirrors 342 and 344 and has a function of guiding the R light separated by the color separation system 33 to a liquid crystal panel for R light. The optical unit 3 is so configured that the relay system 34 guides the R light but is not necessarily configured this way. For example, the optical unit 3 may instead be so configured that the relay system 34 guides the B light.

The optical apparatus 35 includes a light modulator 351 provided for each of the color light fluxes (reference character 351R denotes light modulator for R light, reference character 351G denotes light modulator for G light, and reference character 351B denotes light modulator for B light) and a cross dichroic prism 352 as a light combining optical apparatus.

Each of the light modulators 351 includes a transmissive liquid crystal panel, a light-incident-side polarizer disposed on the light incident side of the liquid crystal panel, and a light-exiting-side polarizer disposed on the light exiting side of the liquid crystal panel and modulates the corresponding color light flux in accordance with image information.

The cross dichroic prism 352 is formed by bonding four rectangular prisms to each other and hence has a substantially square shape in a plan view, and two dielectric multilayer films are formed on the interfaces between the bonded rectangular prisms. In the cross dichroic prism 352, the dielectric multilayer films reflect the R light and the B light modulated by the light modulators 351R and 351B and transmit the G light modulated by the light modulator 351G to combine the three modulated color light fluxes with one another.

The projection lens 36 includes a plurality of lenses and has a zoom adjustment function and a focus adjustment function. The projection lens 36 enlarges and projects the combined light from the cross dichroic prism 352 on the screen.

Figure 2:
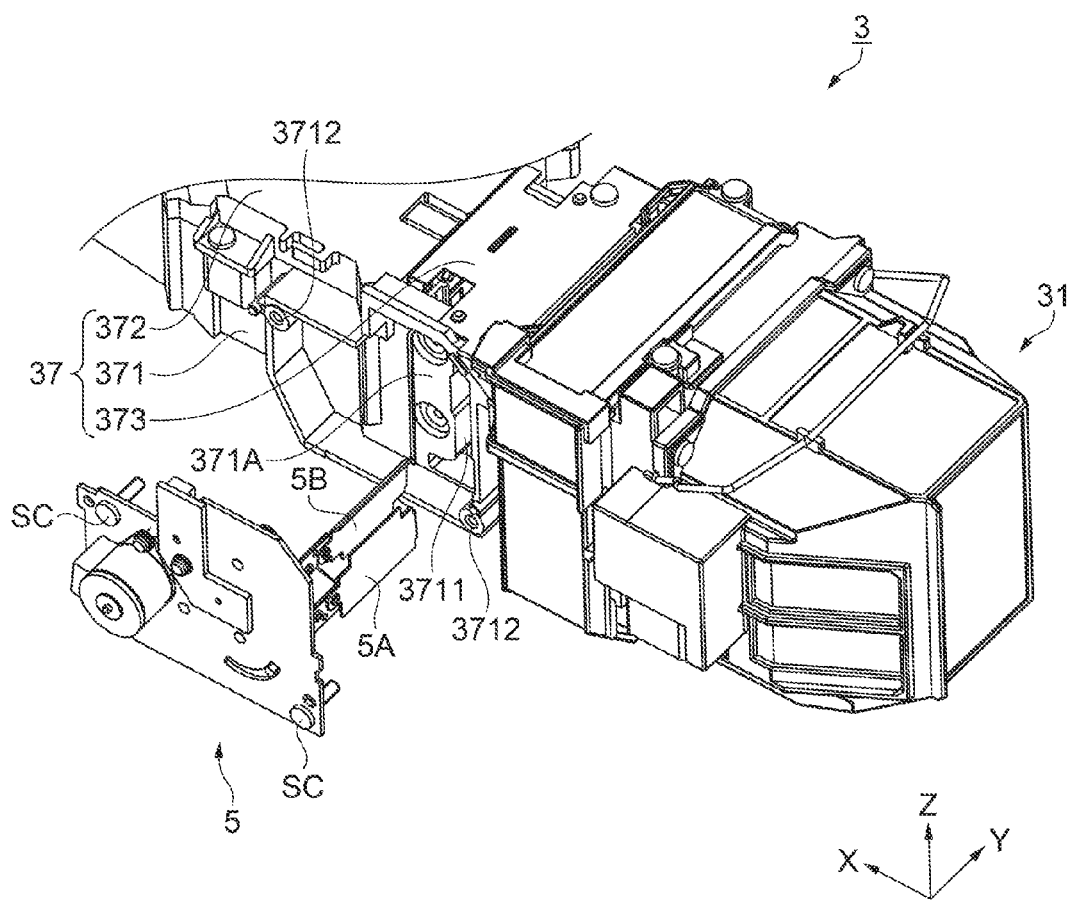
FIG. 2 is a perspective view showing part of an optical unit in the present embodiment.

FIG. 2 is a perspective view showing part of the optical unit 3 and shows the light control apparatus 5 in an exploded state.

The light control apparatus 5 includes a pair of light shields 5A and 5B, as shown in FIG. 2, which are disposed between the first lens array 321 and the second lens array 322, as shown in FIG. 1. The light control apparatus 5 is so controlled by the controller that the light shields 5A and 5B rotate to change their positions in accordance with image information and the amount of light that has passed through the first lens array 321 and will travel through the light shields 5A and 5B is adjusted in accordance with the changed positions thereof. The light control apparatus 5 adjusts the amount of light between a value in a fully closed state in which the light shields 5A and 5B are closed so that light is shielded by the greatest amount and a value in a fully open state in which the light shields 5A and 5B are fully open so that light passes by the greatest amount.

The light control apparatus 5 thus adjusts the amount of light incident on the second lens array 322 and hence the amount of light incident on each of the light modulators 351 to contribute to an improvement in the contrast of a projected image. Further, the light shield 5A is so configured that changing the position thereof allows the direction and speed of cooling air blown off a duct 8, which will be described later, in the cooling apparatus 6 to be changed. The light control apparatus 5 will be described later in detail.

Figure 3A:
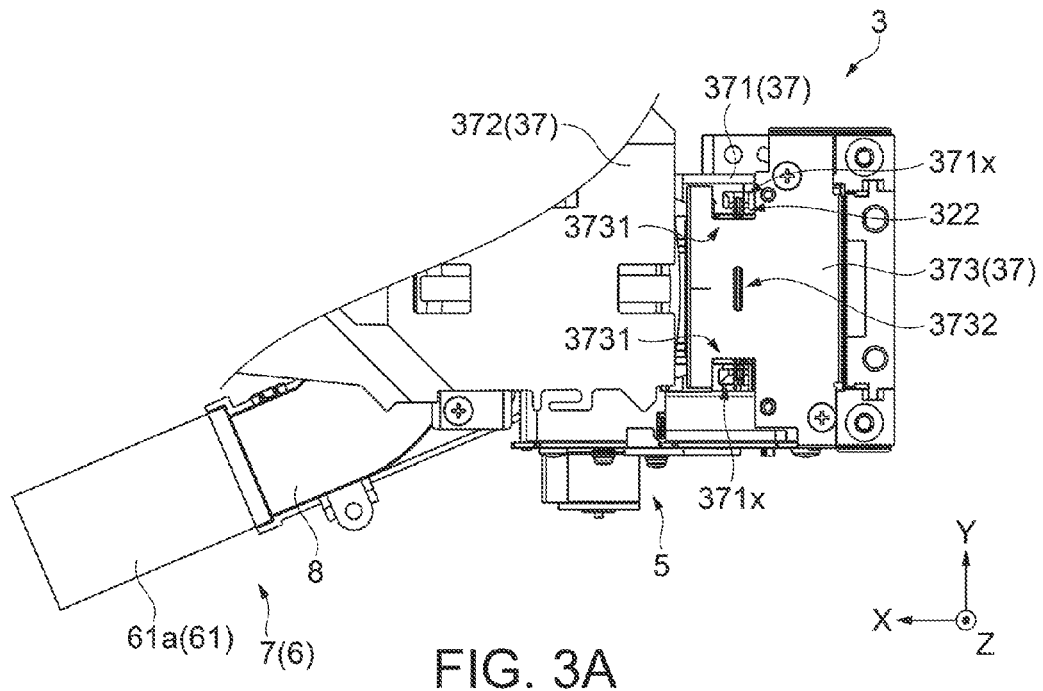
FIGS. 3A and 3B show the optical unit in the vicinity of a light control apparatus and a cooling unit in the present embodiment.
Figure 3B:
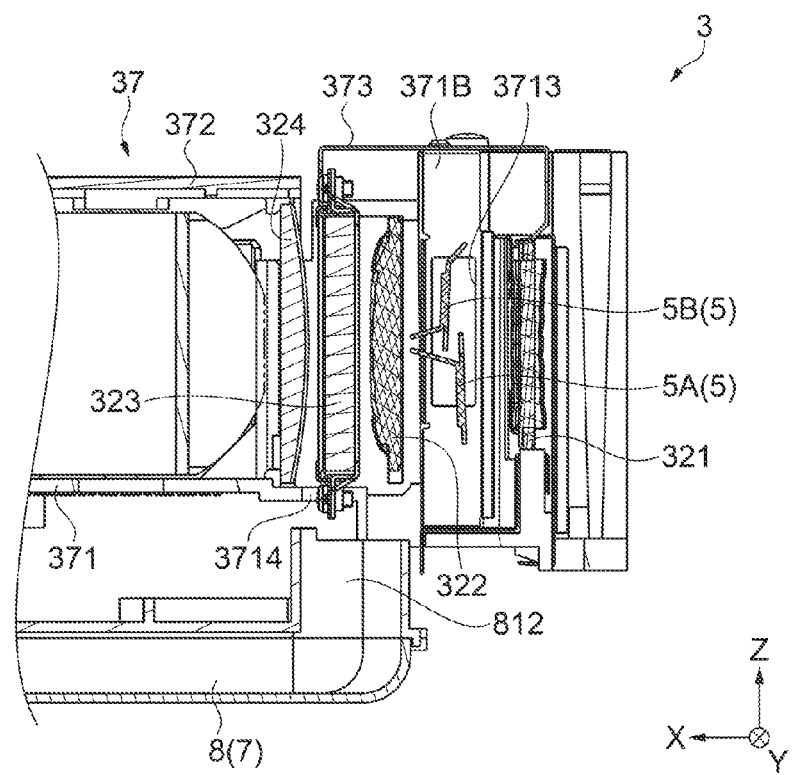

FIGS. 3A and 3B show part of the optical unit 3 in the vicinity of the light control apparatus 5 and a cooling unit 7, which will be described later, in the cooling apparatus 6. FIG. 3A is a plan view of the units viewed from above, and FIG. 3B is a cross-sectional view of the units viewed from rear.

The optical part enclosure 37 has an elongated box-like shape extending in the X direction and includes a lower enclosure 371 and upper enclosures 372 and 373, as shown in FIGS. 2, 3A, and 3B.

The lower enclosure 371 is made of a highly heat resistant material, such as a BMC (bulk molding compound), has a bottom surface portion disposed along the bottom surface of the exterior enclosure 2 and side surface portions that rise upward from the edges of the bottom surface portion, and has a box-like shape that opens upward.

The lower enclosure 371 has a plurality of grooves provided in the inner wall surface of the side surface portion, and the first lens array 321 and other optical parts are disposed with a side end portion of each of the optical parts inserted into the corresponding groove. The lower enclosure 371 further has grooves 371x formed therein, into which a +Y-side side end portion and a −Y-side side end portion of the second lens array 322 are inserted, as shown in FIG. 3A. The second lens array 322, after the position thereof is adjusted, is fixed to the lower enclosure 371 with an adhesive injected into the grooves 371x.

The lower enclosure 371 has an opening 3711 formed in a −Y-side side surface portion 371A and also has threaded holes 3712 provided in the −Y-side side surface portion 371A on the +X and −X sides of the opening 3711, as shown in FIG. 2. The light control apparatus 5 is attached to the lower enclosure 371 with the light shields 5A and 5B inserted into the opening 3711 and screws SC inserted into the threaded holes 3712.

The lower enclosure 371 further has an opening 3713 formed in a +Y-side side surface portion 371B, and an opening 3714 is formed in the bottom surface portion, as shown in FIG. 3B.

The opening 3713 is so formed that it is located in front of the fully closed light shields 5A and 5B. The opening 3714 is so formed that it is located in a portion under the second lens array 322 and the polarization conversion element 323.

The upper enclosure 372 is made, for example, of a glass-fiber-containing PC (polycarbonate). The upper enclosure 372 is disposed over the color separation system 33, the relay system 34, and other components accommodated in the lower enclosure 371 and fixed to the lower enclosure 371 with screws.

The upper enclosure 373 is made of a sheet metal, disposed on the −X side of the upper enclosure 372 with a gap therebetween, located over the first lens array 321, the second lens array 322, the polarization conversion element 323, and other components accommodated in the lower enclosure 371, and fixed to the lower enclosure 371 with screws. The upper enclosure 373, which is also located over the light shields 5A and 5B, is made of a sheet metal, which suppresses optical degradation of the upper enclosure 373 even when it is irradiated with light reflected off the light shields 5A and 5B.

Further, the upper enclosure 373 has a pair of cutouts 3731 formed therein, through which the +Y-side and −Y-side side end portions of the second lens array 322 are visible from above, and an elongated hole 3732 is formed between the pair of cutouts 3731, as shown in FIG. 3A.

The cooling apparatus 6 includes a cooling unit 7, part of which is disposed in a portion below the optical unit 3, a lamp fan (not shown), and an exhaust fan 62, which is disposed in front of the light source apparatus 31, as shown in FIG. 1.

The cooling unit 7 includes three cooling fans 61, each of which sends cooling air, and a duct 8, which guides the cooling air sent from the cooling fans 61 to the optical apparatus 35, the polarization conversion element 323, the light shields 5A and 5B, and other components.

The lamp fan sends the cooling air to the light source apparatus 31. The exhaust fan 62 exhausts heated air in the exterior enclosure 2 out thereof. The cooling unit 7 will be described later in detail.

Configuration of Light Control Apparatus

The light control apparatus 5 will now be described in detail.

Figure 4:
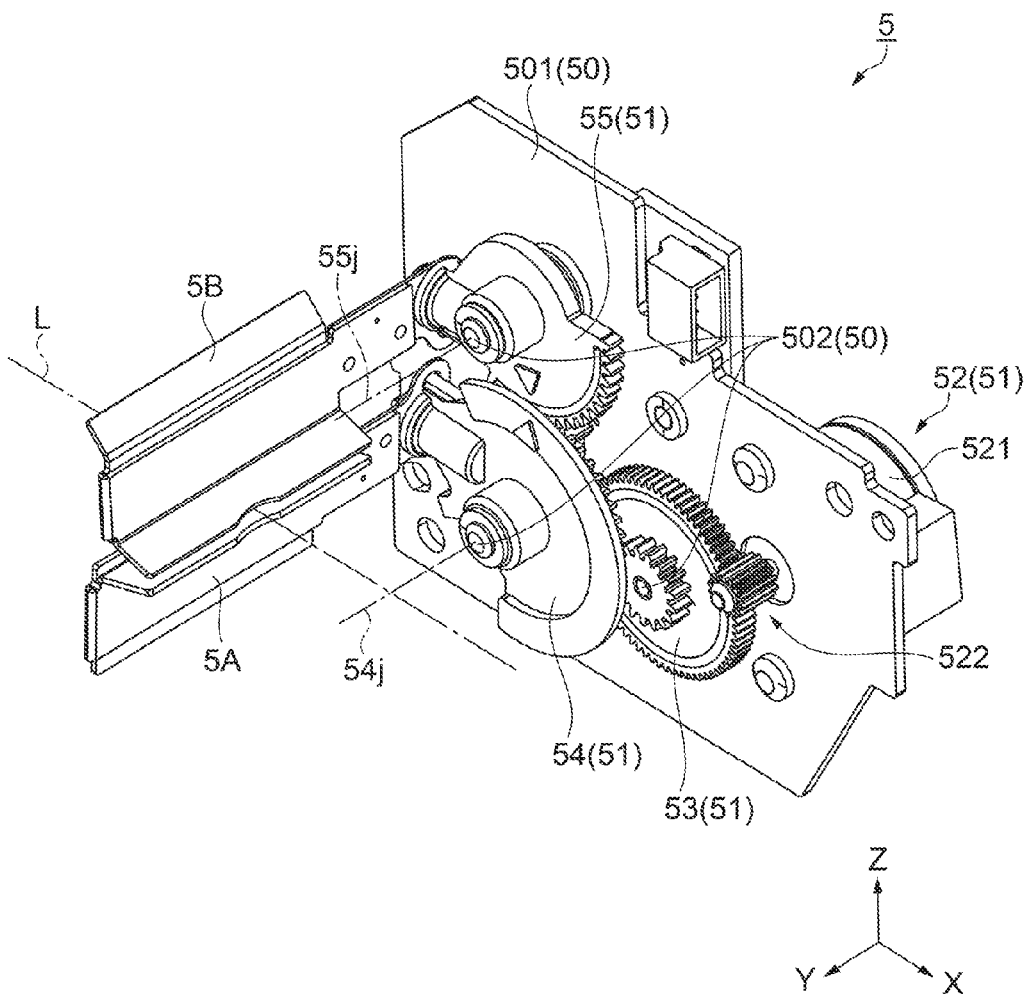
FIG. 4 is a perspective view of the light control apparatus in the present embodiment.

FIG. 4 is a perspective view of the light control apparatus 5.

The light control apparatus 5 includes not only the light shields 5A and 5B but also a base 50 and a driver 51, as shown in FIG. 4. The driver 51 includes a stepper motor (hereinafter abbreviated to "motor") 52, a first gear 53, a second gear 54, and a third gear 55 and rotates the light shields 5A and 5B under the control of the controller to change a separation distance between the light shields 5A and 5B.

The base 50 has a base body 501 made of a sheet metal and a plurality of support shafts 502 attached to the base body 501 and is configured to support the driver 51, as shown in FIG. 4. Specifically, the base 50 is so disposed that the base body 501 is located on the −Y side of the optical axis L and the support shafts 502 protrude toward the +Y side of the base body 501.

The motor 52 is connected to the controller via a cable (not shown) and driven by the controller.

The motor 52 includes a motor body 521 having a spindle that serves as a rotary shaft and a pinion 522 provided at the front end of the spindle, as shown in FIG. 4. The motor 52 is fixed to the −Y-side surface of the base body 501 with screws in such a way that the pinion 522 protrudes through the +Y-side surface of the base body 501, as shown in FIG. 4.

The first gear 53, the second gear 54, and the third gear 55 are supported by the support shafts 502, which protrude toward the +Y side of the base body 501.

The first gear 53 engages with the pinion 522 and transmits a drive force produced by the motor 52 to the second gear 54. Specifically, the first gear 53 is formed of two gears having outer diameters different from each other and coaxially layered on each other, as shown in FIG. 4. One of the two gears that form the first gear 53, the gear having a larger diameter engages with the pinion 522, and the first gear 53 is supported by one of the support shafts 502. The first gear 53 reduces the speed of rotation of the pinion 522 and transmits the reduced speed of rotation to the second gear 54.

The second gear 54 has a semicircular shape in a plan view, as shown in FIG. 4. A circumferential edge protrusion is formed on the +Y side of the outer circumference of the semicircular shape, and teeth that engage with one of the two gears that form the first gear 53, specifically, the gear having a smaller diameter are formed on the −Y side of the circumferential edge protrusion. The second gear 54 transmits the drive force produced by the motor 52 and transmitted via the first gear 53 to the third gear 55.

The third gear 55 has a semicircular shape in a plan view, and teeth that engage with the second gear 54 are formed along the semicircular outer circumference, as shown in FIG. 4. The drive force produced by the motor 52 and transmitted via the first gear 53 and the second gear 54 rotates the third gear 55 in the direction opposite to the direction in which the second gear 54 rotates.

The light shields 5A and 5B are made of a sheet metal, and end portions thereof on the −Y-side of the optical axis L are supported by the second gear 54 and the third gear 55 respectively in such a way that the light shields 5A and 5B behave as cantilevers, as shown in FIG. 4. That is, the light shield 5A rotates around an axis of rotation 54j of the second gear 54, and the light shield 5B rotates around an axis of rotation 55j of the third gear 55. Further, the light shields 5A and 5B rotate around the axes of rotation 54j and 55j, respectively, which are located on the +X side of the light shields 5A and 5B, that is, shifted from the light shields 5A and 5B toward the polarization conversion element 323, as shown in FIG. 4.

The light shields 5A and 5B protrude in the +Y direction with respect to the driver 51 and are disposed on opposite sides of the optical axis L.

Each of the light shields 5A and 5B has a dimension in the Y direction set in accordance with the dimension, in the same direction, of the region where each of the lenslets of the second lens array 322 is formed and has a dimension in a direction that intersects the Y direction set to be about one-half the dimension, in the same direction, of the region where the lenslet is formed.

The light shields 5A and 5B move in the direction in which they approach each other or move in the direction in which they separate from each other in accordance with the rotation of the second gear 54 and the third gear 55. The separation distance between the light shields 5A and 5B is thus changed, whereby the amount of light that passes through the gap between the light shields 5A and 5B is adjusted.

Configuration of Cooling Unit

The cooling unit 7 will next be described in detail.

The cooling unit 7 includes the three cooling fans 61 and the duct 8, as described above.

The three cooling fans 61 are formed of a cooling fan 61a, which primarily cools a portion in the vicinity of the light modulator 351B, the polarization conversion element 323, and the light shields 5A and 5B, a cooling fan 61b, which primarily cools the light modulator 351R, and a cooling fan 61c, which primarily cools the light modulator 351G.

Each of the cooling fans 61a, 61b, and 61c is formed of a sirocco fan having a substantially cylindrical shape and so dimensioned that the thickness of the substantially cylindrical shape is smaller than the outer diameter thereof.

Figure 5:
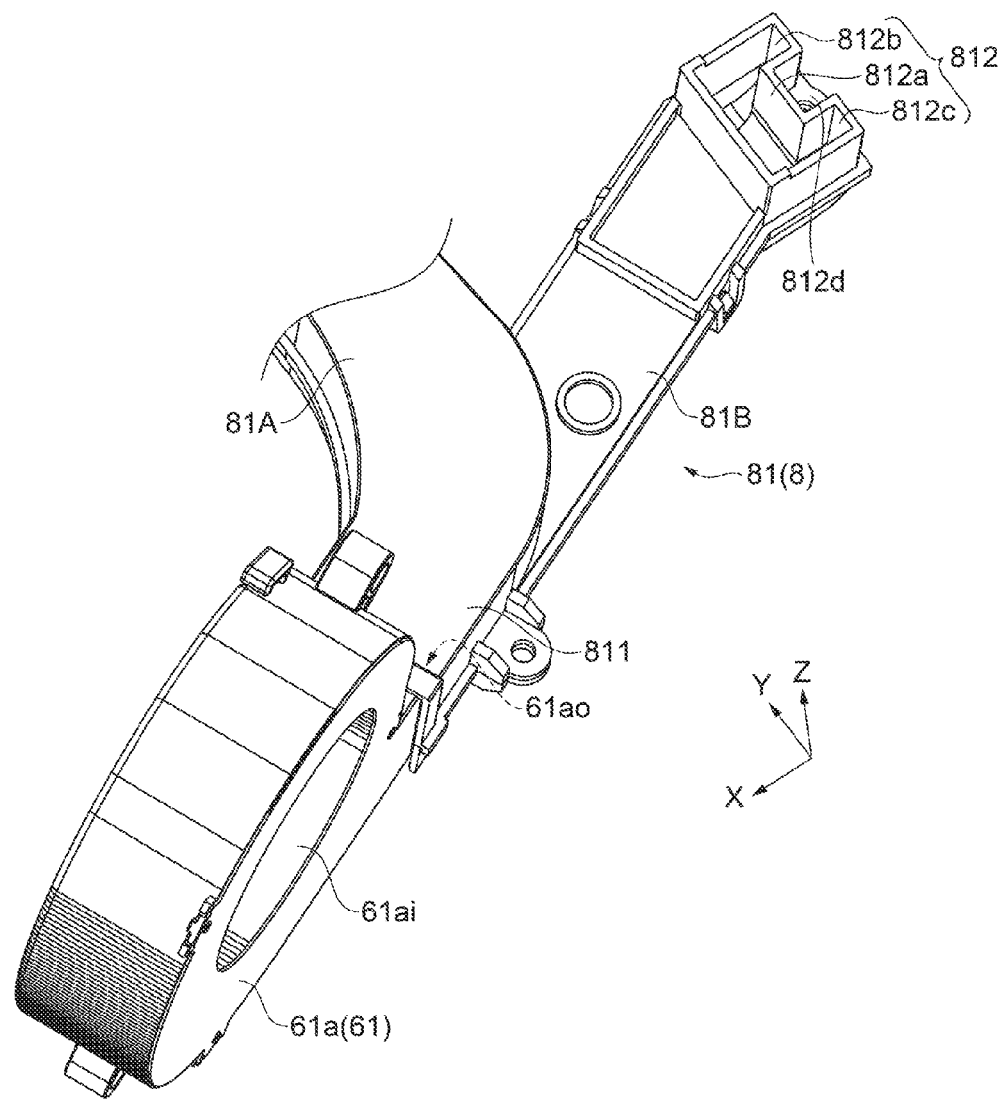
FIG. 5 is a perspective view showing a cooling fan and part of a duct in the present embodiment.

FIG. 5 is a perspective view showing the cooling fan 61a and part of the duct 8. Specifically, FIG. 5 shows a channel forming portion 81, which is part of the duct 8 and guides cooling air sent from the cooling fan 61a to a target to be cooled.

The cooling fan 61a is disposed in a position behind the optical apparatus 35 and outside the optical part enclosure 37, as shown in FIG. 1, and so disposed that the outer diameter direction of the substantially cylindrical shape is oriented in the upward/downward direction, as shown in FIG. 5. The cooling fan 61a is further so disposed that an intake port 61ai, through which the cooling air is introduced, is oriented in a direction inclined to the rear toward the −X side and a discharge port 61ao, through which the introduced cooling air is discharged, is oriented in a direction inclined to the −X direction toward the front.

Although not illustrated in detail, the cooling fan 61b is disposed in a position shifted from the cooling fan 61a in the +X direction with part of the cooling fan 61b located below the optical part enclosure 37 (see FIG. 1) and the intake port oriented upward. The cooling fan 61c is located in a position shifted from the projection lens 36 toward the +X side (see FIG. 1) with the intake port oriented toward the +X side.

The duct 8 has a plurality of channels formed therein, which guide the cooling air sent from the cooling fans 61a, 61b, and 61c toward targets to be cooled.

A detailed description will be made of part of the duct 8, specifically, the channel forming portion 81, through which the cooling air sent from the cooling fan 61a is guided.

The channel forming portion 81 has a tubular portion 811, which covers the discharge port 61ao of the cooling fan 61a, and a first channel forming portion 81A and a second channel forming portion 81B, into which the tubular portion 811 bifurcates, as shown in FIG. 5.

The first channel forming portion 81A is so formed that it guides part of the cooling air sent from the cooling fan 61a primarily to the light modulator 351B. The first channel forming portion 81A extends in the −X direction from the upper side of the tubular portion 811 in the upward/downward direction and then smoothly bends in the +Y direction as shown in FIG. 5, and a blowoff port (not shown) off which the cooling air having traveled through the first channel forming portion 81A is blown is formed at the front end of the first channel forming portion 81A. The blowoff port is so formed that it is located below the light modulator 351B, and the cooling air having traveled through the first channel forming portion 81A is sent to the light modulator 351B from below and cools the light modulator 351B.

The second channel forming portion 81B is so formed that it guides part of the cooling air sent from the cooling fan 61a to a portion in the vicinity of the polarization conversion element 323, the second lens array 322, and the light shields 5A and 5B. The second channel forming portion 81B extends in the −X direction from the lower side of the tubular portion 811 in the upward/downward direction, and a blowoff port 812, which opens upward and off which the cooling air having traveled through the second channel forming portion 81B is blown toward the polarization conversion element 323, the second lens array 322, and the light shields 5A and 5B, is formed at the front end of the second channel forming portion 81B, as shown in FIG. 5.

Figure 6:
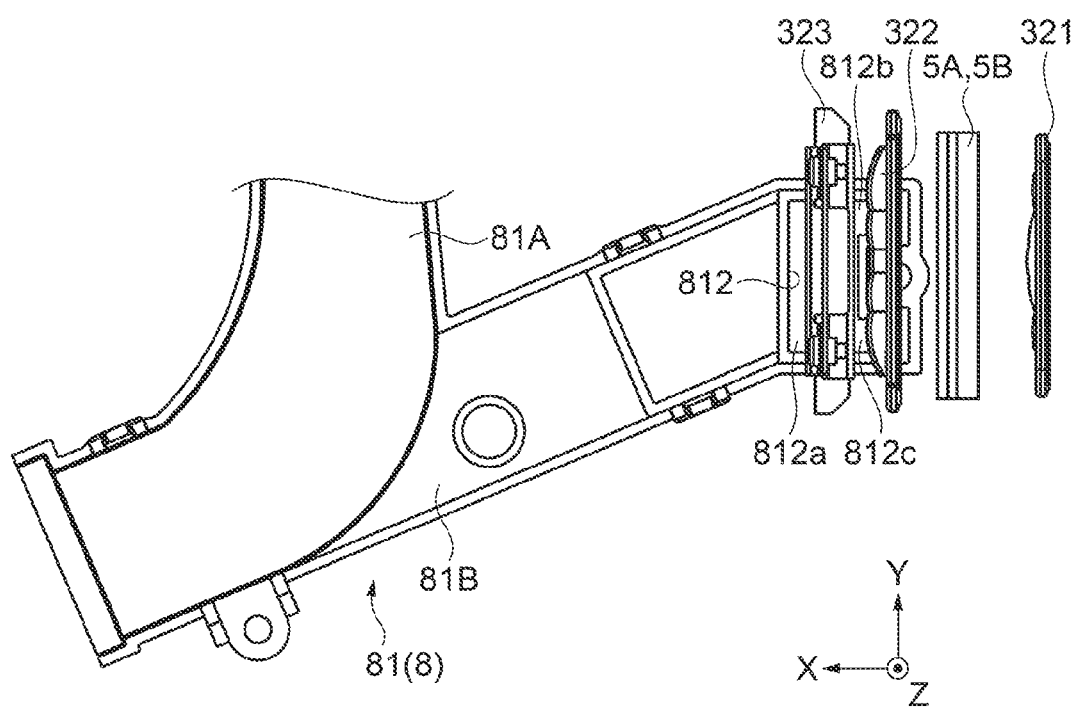
FIG. 6 is a plan view showing a portion in the vicinity of a channel forming portion and a blowoff port in the present embodiment.

FIG. 6 is a plan view showing a portion in the vicinity of the channel forming portion 81 and the blowoff port 812.

The blowoff port 812 is so formed that it is located below the second lens array 322 and the polarization conversion element 323, as shown in FIG. 6.

The blowoff port 812, which has a rectangular shape when viewed from above, is further so formed that a −X-side central portion of the rectangular shape is recessed, as shown in FIG. 5. That is, the blowoff port 812 has an optical-element-side blowoff portion 812a, which is located on the +X side of the recessed −X-side central portion (recess 812d), a light-shield-side blowoff portion 812b, which is located on the +Y side of the recess 812d, and a light-shield-side blowoff portion 812c, which is located on the −Y side of the recess 812d.

The light-shield-side blowoff portions 812b and 812c are set apart from each other with the light-shield-side blowoff portion 812b formed in a position in the vicinity of the +Y-side side end portion of the second lens array 322 and the light-shield-side blowoff portion 812c formed in a position in the vicinity of the −Y-side side end portion of the second lens array 322 when viewed from above, as shown in FIG. 6. Further, the light-shield-side blowoff portions 812b and 812c are so formed that they have the same opening area.

The opening area of the optical-element-side blowoff portion 812a is greater than the opening area of each of the light-shield-side blowoff portions 812b and 812c. The blowoff port 812 is thus so formed that the shape of the opening of the optical-element-side blowoff portion 812a differs from the shape of the opening of each of the light-shield-side blowoff portions 812b and 812c.

The blowoff port 812 is then so disposed that the optical-element-side blowoff portion 812a, which is a blowoff portion for the polarization conversion element 323, is located below the polarization conversion element 323 and the light-shield-side blowoff portions 812b and 812c, which are blowoff portions for the light shield 5A, are located below the second lens array 322, as shown in FIG. 6. The blowoff port 812 is further formed in a position closer to the polarization conversion element 323 than to the light shields 5A and 5B, as shown in FIG. 6.

Action of Light Control Apparatus and Flow of Cooling Air

The light shield 5A covers the light-shield-side blowoff portions 812b and 812c by a variable amount in accordance with the position of the rotated light shield 5A. The cooling air is blown off the blowoff port 812 in a variable direction at a variable speed according to the amount of light-shield-side blowoff portions 812*b* and 812*c* covered with the light shield 5A.

Figure 7A:
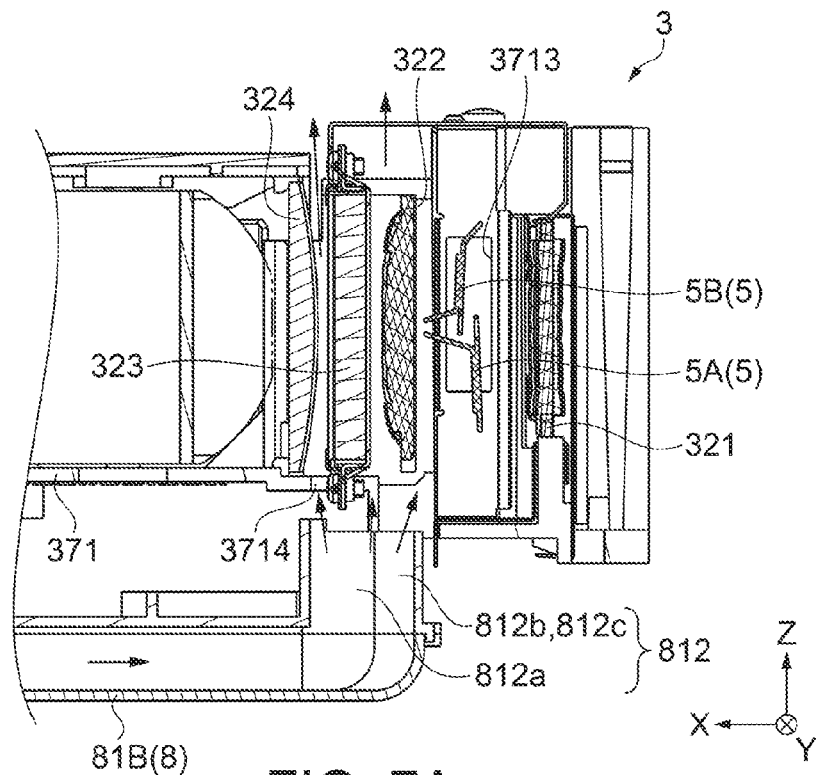
FIGS. 7A and 7B are cross-sectional views showing part of the optical unit in the vicinity of light shields.
Figure 7B:
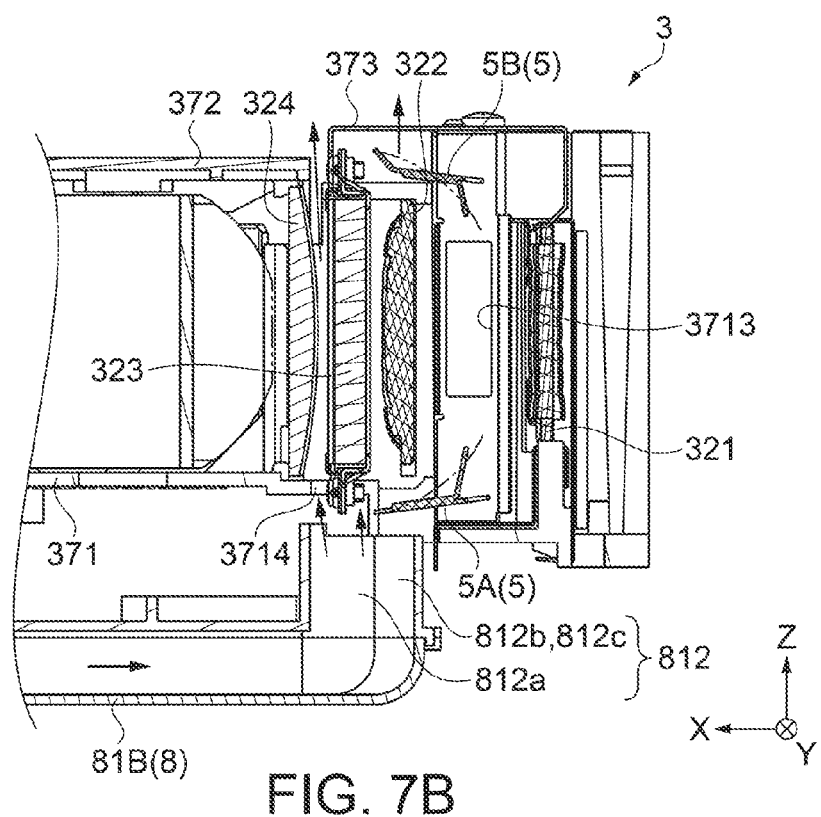

FIGS. 7A and 7B are cross-sectional views showing part of the optical unit 3 in the vicinity of the light shields 5A and 5B. FIG. 7A shows a state in which the light shields 5A and 5B are fully closed, and FIG. 7B shows a state in which the light shields 5A and 5B are fully open.

When the light shields 5A and 5B are fully closed, the light shield 5A is separate from the blowoff port 812, and hence the light-shield-side blowoff portions 812*b* and 812*c* are not covered with the light shield 5A, as shown in FIG. 7A. In the state in which the light-shield-side blowoff portions 812*b* and 812*c* are not covered with the light shield 5A, the cooling air blown off the blowoff port 812 is smoothly blown off the optical-element-side blowoff portion 812*a* and the light-shield-side blowoff portions 812*b* and 812*c*. Further, since the cooling air having been sent from the cooling fan 61*a* and having traveled through the second channel forming portion 81B is urged in the −X direction, the cooling air that reaches a portion immediately above the blowoff port 812 travels in the −X direction.

Specifically, the cooling air blown off the optical-element-side blowoff portion 812*a* is primarily oriented toward the polarization conversion element 323 and the second lens array 322, and the cooling air blown off the light-shield-side blowoff portions 812*b* and 812*c* is primarily oriented toward the second lens array 322 and the light shields 5A and 5B.

The cooling air oriented toward the polarization conversion element 323 cools the light exiting side and the light incident side of the polarization conversion element 323. The cooling air having cooled the light exiting side of the polarization conversion element 323 flows through the gap between the upper enclosure 372 and the upper enclosure 373 and exits out of the optical unit 3. The cooling air having cooled the light incident side of the polarization conversion element 323 primarily flows through the pair of cutouts 3731 (see FIG. 3A) of the upper enclosure 373 and exits out of the optical unit 3.

The cooling air oriented toward the second lens array 322 cools the second lens array 322, then primarily flows through the pair of cutouts 3731 (see FIG. 3A), and exits out of the optical unit 3. The cooling air having cooled tsecond lens array 322 and traveled toward the pair of cutouts 3731, which are formed in positions in the vicinity of the side end portions of the second lens array 322, cools the adhesive that fixes the second lens array 322. Further, since the light-shield-side blowoff portions 812*b* and 812*c* are formed in positions in the vicinity of the +Y-side and −Y-side side end portions of the second lens array 322 respectively, the cooling air blown off the light-shield-side blowoff portions 812*b* and 812*c* travels through portions in the vicinity of the side end portions of the second lens array 322 and hence more efficiently cools the adhesive that fixes the second lens array 322.

The cooling air oriented toward the light shields 5A and 5B cools the light shields 5A and 5B, which are covered with the upper enclosure 373 from above, and hence flows through the opening 3713 of the lower enclosure 371 and exits out of the optical unit 3.

The cooling air having cooled the polarization conversion element 323, the second lens array 322, the light shields 5A and 5B, and other components and exited out of the optical unit 3 is exhausted through the exhaust fan 62 (see FIG. 1) out of the projector 1.

On the other hand, when the fully closed light shields 5A and 5B are rotated and the amount of light that passes therethrough gradually increases (the amount of light shielded by the light shields 5A and 5B decreases) accordingly, the light shield 5A approaches the blowoff port 812, and the amount of covered light-shield-side blowoff portions 812*b* and 812*c* increases. When the light shields 5A and 5B are fully open, the light shield 5A is located below the second lens array 322, and the light shield 5B is located above the second lens array 322, as shown in FIG. 7B. Further, the light shield 5A, which approaches the blowoff port 812, substantially covers the light-shield-side blowoff portions 812*b* and 812*c*. Even in the state in which the light-shield-side blowoff portions 812*b* and 812*c* are substantially covered, a gap is present between the light shield 5A and the duct 8, but the cooling air is unlikely to be delivered out of the light-shield-side blowoff portions 812*b* and 812*c*, whereby the cooling air is blown off the optical-element-side blowoff portion 812*a* by a greater amount at a greater speed than in the fully closed state. That is, when the light shields 5A and 5B are fully open, cooling air is sent to the polarization conversion element 323 by a greater amount at a greater speed than in the fully closed state.

As described above, when the amount of shielded light decreases, the position of the light shield 5A changes in such a way that the amount of covered light-shield-side portion of the blowoff port 812 (light-shield-side blowoff portions 812*b* and 812*c*) increases. In this case, the cooling air is blown off the blowoff port 812 along a path outside the trajectory along which the light shield 5A rotates and in a direction that intersects the rotation trajectory when viewed in the direction of the axis of rotation 54*j* (see FIG. 4). The amount and speed of the cooling air blown off the optical-element-side blowoff portion 812*a* increase as the amount of light-shield-side blowoff portions 812*b* and 812*c* covered with the light shield 5A increases.

As described above, the present embodiment can provide the following advantageous effects.

(1) Since the position of the light shield 5A changes in such a way that the amount of covered light-shield-side blowoff portions 812*b* and 812*c* increases as the amount of shielded light decreases, the cooling air is blown off the optical-element-side blowoff portion 812*a* at an increased speed by an increased amount, whereby the polarization conversion element 323, which is heated to a high temperature when the light control apparatus 5 allows to pass a large amount of light, can be efficiently cooled.

On the other hand, since the position of the light shield 5A changes in such a way that the amount of covered light-shield-side blowoff portions 812*b* and 812*c* decreases as the amount of shielded light increases, the cooling air can be blown off the light-shield-side blowoff portions 812*b* and 812*c*, whereby the light shields 5A and 5B, each of which is heated to a high temperature when a large amount of light is shielded, can be efficiently cooled. The light shields 5A and 5B and the second lens array 322, which is disposed in a position in the vicinity of the light shields 5A and 5B, will therefore not be heated to high temperatures.

Therefore, without using any member other than the light control apparatus 5, the direction and speed of the cooling air blown off the blowoff port 812 can be so adjusted that the polarization conversion element 323, the light shields 5A and 5B, the second lens array 322 disposed in a position in the vicinity of the light shields 5A and 5B, and other members, the temperatures of which increase by different amounts in accordance with the state of the action of the light control apparatus 5, can be efficiently cooled, whereby degradation of the members described above due to the high temperatures can be suppressed. The projector 1 provided in accordance with the present embodiment can therefore project an image having satisfactory image quality with the light control apparatus 5 operating in a stable manner and optical characteristics of the polarization conversion element 323, the second lens array 322, and other components ensured for a long period.

(2) Since the light shields 5A and 5B are efficiently cooled even in the fully closed state in which the light shields 5A and 5B shield a large amount of light, degradation of the first gear 53, the second gear 54, which form the light control apparatus 5, the adhesive that fixes the second lens array 322, the optical part enclosure 37, and other components due to high temperatures can be suppressed.

(3) The light shields 5A and 5B rotate to adjust the amount of light that passes therethrough. The amount of covered light-shield-side portion of the blowoff port 812 (light-shield-side blowoff portions 812b and 812c) changes in accordance with the rotation of the light shield 5A. That is, the light shield 5A is caused to separate from the blowoff port in the state in which the light shields 5A and 5B approach each other and the amount of light that passes therethrough decreases accordingly, whereas the light shield 5A is caused to approach the blowoff port 812, that is, the amount of covered light-shield-side portion of the blowoff port 812 (light-shield-side blowoff portions 812b and 812c) can be increased as the state in which the amount of light that passes through the light shields 5A and 5B is small transitions to a state in which the light shields 5A and 5B are so rotated that the amount of light that passes therethrough gradually increases (the amount of light shielded by the light shields 5A and 5B decreases). The amount of light that passes through the light shields 5A and 5B and the amount of light-shield-side blowoff portions 812b and 812c covered with the light shield 5A can be readily adjusted.

(4) Since the light shields 5A and 5B rotate around the axes of rotation 54j and 55j, which are shifted from the light shields 5A and 5B toward the polarization conversion element 323, the light shield 5A can cover the light-shield-side blowoff portions 812b and 812c of the blowoff port 812 even when the blowoff port 812 is formed in a position shifted from the light shields 5A and 5B toward the polarization conversion element 323. The cooling air can therefore be sent to the polarization conversion element 323 at a higher speed than in a case where the blowoff port extends to a position below the light shields 5A and 5B.

(5) The blowoff port 812 is so formed that the cooling air is blown off along a path outside the trajectory along which the light shield 5A rotates and in a direction that intersects the trajectory path when viewed in the direction of the axis of rotation 54j. As a result, the light shield 5A, specifically, the light shielding portion thereof can cover the light-shield-side blowoff portions 812b and 812c, whereby the light shield 5A does not necessarily have a special portion for covering the light-shield-side blowoff portions 812b and 812c and hence the shape of the light shield 5A can be simplified.

(6) The shape of the opening of the optical-element-side blowoff portion 812a differs from the shape of the opening of each of the light-shield-side blowoff portions 812b and 812c, and the light-shield-side blowoff portions 812b and 812c are formed in positions in the vicinity of the +Y-side and −Y-side side end portions of the second lens array 322. As a result, the cooling air is likely to flow to the portions where the second lens array 322 is glued, preventing the adhesive from softening and reliably maintaining the second lens array 322 in the glued position.

Further, since the cutouts 3731 located in positions in the vicinity of the side end portions of the second lens array 322 are formed in the upper enclosure 373 disposed above the second lens array 322, the cooling air is more likely to flow to the portions where the second lens array 322 is glued.

Variations

The embodiment described above may be changed as follows.

The light control apparatus 5 in the embodiment described above is so configured that the rotatable light shields 5A and 5B adjust the amount of light that passes therethrough and adjust the amount of covered light-shield-side portion of the blowoff port 812. The light control apparatus may instead be so configured that a pair of slidable light shields adjust the amount of light that passes therethrough and adjust the amount of covered light-shield-side portion of the blowoff port 812.

Figure 8A:
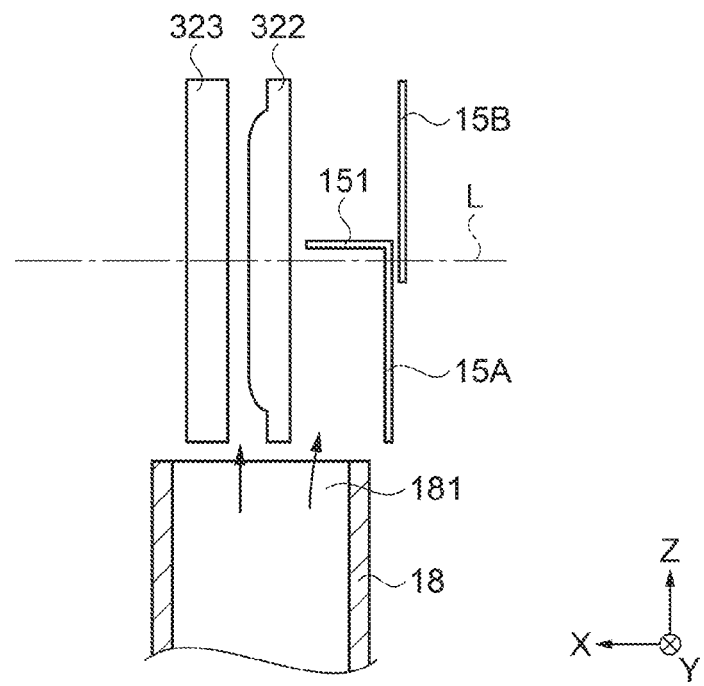
FIGS. 8A and 8B are diagrammatic views for describing a light control apparatus according to a variation.
Figure 8B:
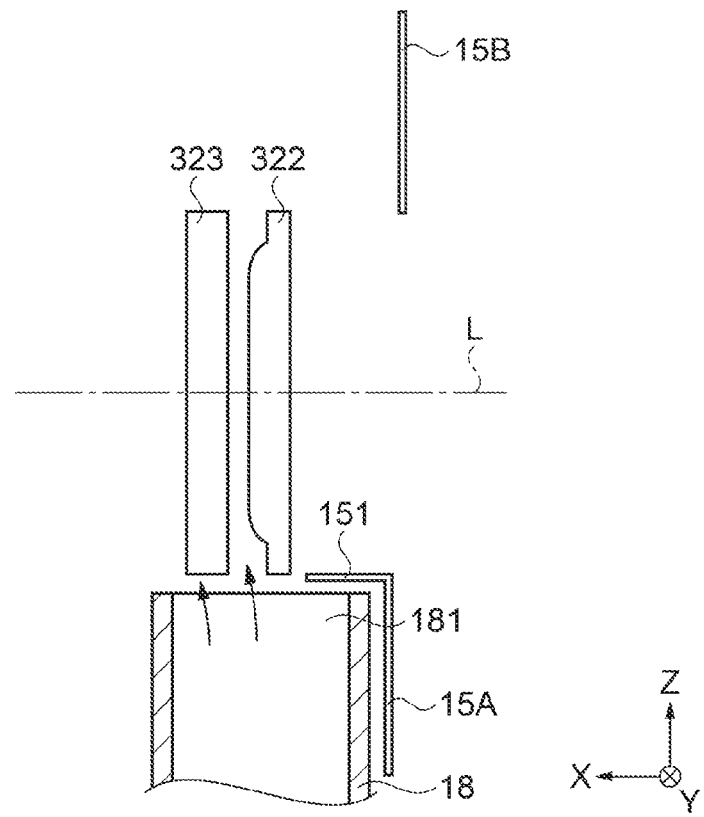

FIGS. 8A and 8B are diagrammatic views for describing a light control apparatus according to the present variation. FIG. 8A shows a case where light shields 15A and 15B are fully closed, and FIG. 8B shows a case where the light shields 15A and 15B are fully open.

The pair of light shields 15A and 15B are disposed on opposite sides of the optical axis L and are slidable in the upward/downward direction in such a way that the distance therebetween is changeable, as shown in FIGS. 8A and 8B. Further, the light shield 15A, on the side where a duct 18 is disposed, is provided with a protruding portion 151, which protrudes toward the second lens array 322.

In the fully closed state, the protruding portion 151 is separate from a blowoff port 181 of the duct 18, and the cooling air is smoothly blown off the blowoff port 181 and sent to the polarization conversion element 323, the second lens array 322, and the light shields 15A and 15B, as shown in FIG. 8A.

On the other hand, in the fully open state, the protruding portion 151 covers a portion of the blowoff port 181 on the side where the light shields 15A and 15B are present, and the cooling air is blown off a portion of the blowoff port 181 on the side where the polarization conversion element 323 is present by a larger amount at a greater speed than in the fully closed state, as shown in FIG. 8B.

The blowoff port 812 in the embodiment described above is so configured that it allows the cooling air to be blown off in a position below the light shields 5A and 5B and the polarization conversion element 323. A blowoff port off which the cooling air is blown may instead be formed in a position other than the lower position, and the light shields may have a portion that can cover a light-shield-side portion of the blowoff port.

Three cooling fans 61 are provided in the embodiment described above, but the number of cooling fans 61 may not be three.

The projector 1 according to the embodiment described above includes a transmissive liquid crystal panel as each of the light modulators 351, but a reflective liquid crystal panel may instead be used. Further, a micromirror-type light modulator, for example, a DMD (digital micromirror device), may be used as each of the light modulators.

The light modulators 351 in the embodiment described above operate based on what is called a three-plate method using three light modulators corresponding to R light, G light, and B light. The light modulators 351 do not necessarily operate based on the three-plate method and may operate based on a single-plate method, or the invention is also applicable to a projector including two light modulators or four or more light modulators.

The light source apparatus 31 does not necessarily include a discharge-type lamp and may instead include a lamp that emits light based on a different mechanism, a light emitting diode, a laser, or any other solid-state light source.

CROSS REFERENCE TO RELATED APPLICATIONS

This application claims priority to Japanese Patent Application No. 2013-188033 filed on Sep. 11, 2013, the entire contents of which are incorporated by reference herein.

What is claimed is:

1. A projector comprising:
a light source;
a light control apparatus having a light shield portion that shields light emitted from the light source, the light control apparatus adjusting the amount of light that passes therethrough;
an optical element that is disposed on the light exiting side of the light shield portion and optically converts light incident on the optical element;
a cooling fan that sends cooling air; and
a duct that guides the cooling air sent from the cooling fan to the light shield portion and the optical element,
wherein the duct has a blowoff port off which the guided cooling air is blown toward the light shield portion and the optical element, and
the light shield portion changes the amount of covered light-shield-side portion of the blowoff port in accordance with the amount of shielded light.

2. The projector according to claim 1,
wherein the light shield portion changes the position thereof in such a way that the amount of covered blowoff port increases as the amount of shielded light decreases.

3. The projector according to claim 2,
wherein the light shield portion is formed of a pair of light shields provided on opposite sides of an optical axis of the light emitted from the light source,
the light control apparatus adjusts the amount of light that passes through the light shields in accordance with a separation distance between the pair of light shields produced by rotation thereof, and
the amount of covered light-shield-side portion of the blowoff port changes in accordance with rotation of one of the pair of light shields.

4. The projector according to claim 3,
wherein each of the light shields rotates around an axis of rotation that is shifted from the light shield portion toward the optical element and parallel to a plane perpendicular to the optical axis of the light emitted from the light source.

5. The projector according to claim 4,
wherein the blowoff port is formed to blow the cooling air along a path outside a trajectory along which the one of the light shields rotates and in a direction that intersects the rotation trajectory when viewed in the direction of the corresponding axis of rotation.

6. The projector according to claim 5,
wherein the light control apparatus adjusts the direction of the cooling air blown off the blowoff port by rotating the one of the light shields.

7. The projector according to claim 1,
wherein the blowoff port has a light-shield-side blowoff portion that is a blowoff portion for the light shield portion and an optical-element-side blowoff portion that is a blowoff portion for the optical element, and
the shape of an opening of the light-shield-side blowoff portion differs from the shape of an opening of the optical-element-side blowoff portion.

* * * * *